3,770,707
NITROBENZOTHIAZOLE ALKYL OR CYCLO-
ALKYL DISULFIDES
Kamel Boustany, John Joseph D'Amico, and Alfred Bay Sullivan, Akron, Ohio, assignors to Monsanto Company, St. Louis, Mo.
No Drawing. Filed Dec. 15, 1971, Ser. No. 208,408
Int. Cl. C08c 11/62; C08f 27/06
U.S. Cl. 260—79.5 B                6 Claims

ABSTRACT OF THE DISCLOSURE

This invention relates to new compounds which are useful as accelerators in the vulcanization of rubber. More particularly, it pertains to aliphatic nitrobenzothiazolyl disulfides which are classified in class 260–306 of the Patent Office.

BACKGROUND OF THE INVENTION

Mercaptobenzothiazole and bis-benzothiazolyl disulfides are fast organic vulcanization accelerators used rather widely in the rubber industry. However, in many manufacturing processes they lack adequate processing safety which has resulted in their replacement by more expensive delayed-action accelerators or has required the addition of prevulcanization inhibitors. The use of unsymmetrical disulfides as accelerators has been suggested. For example, Bogemann, U.S. 2,026,863, Jan. 7, 1936 describes use of aryl benzothiazolyl disulfides and aryl nitrobenzothiogolyl disulfides. Among disulfides prepared by Kleiman, U.S. 2,510,893–4, June 6, 1950 are cyclopentyl benzothiazolyl disulfide and the thienyl benzothiazolyl disulfide. An investigation of known benzothiazolyl disulfides shows that unsubstituted benzothiazolyl phenyl disulfide has more processing safety than bis-benzothiazolyl disulfide but said improvement is achieved with a considerable loss in cure rate, and further shows that nitro substitution of the benzothiazole moiety enhances the rate of cure with a coincidental loss of processing safety.

SUMMARY OF THE INVENTION

We have discovered certain alkyl- and cycloalkyl-nitrobenzothiazolyl disulfides which are improved accelerators of vulcanization. The new class of unsymmetrical nitrobenzothiazolyl disulfides possess considerably more processing safety than the known nitrobenzothiazolyl phenyl disulfide and also rapidly cure rubber. The class is represented by the formula:

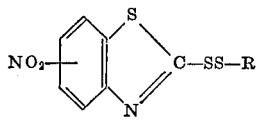

in which R is alkyl or cycloalkyl. Alkyl means univalent radicals of the series $C_nH_{2n+1}$ and includes straight or branched chains. Primary, secondary, and tertiary alkyl radicals of 1–12 carbon atoms are satisfactory with branched alkyl radicals of 3–8 carbon atoms being a preferred subgroup. For example, methyl, ethyl, propyl, isopropyl, n-butyl, sec-butyl, isobutyl, tert-butyl, n-amyl, sec-amyl, iso-amyl, hexyl, 1,3-dimethyl-butyl, 1,4-dimethyl-pentyl, heptyl, octyl, tert-octyl, n-nonyl, tert-nonyl, decyl, undecyl and dodecyl. Cycloalkyl means univalent radicals of the series $C_nH_{2n-1}$ and includes alkyl substituted cyclic radicals. Cycloalkyl radicals of 5–12 carbon atoms are satisfactory with radicals of 5–8 carbon atoms in the ring being preferred. Examples are cyclopentyl, 2-methylcyclopentyl, cyclohexyl, 2 - methylcyclohexyl, 4 - methylcyclohexyl, 2,5 - dimethylcyclohexyl, 4-tert-butyl-cyclohexyl, 3,3,5-trimethylcyclohexyl, 5-tert-butyl-2-methylcyclohexyl, cyclohexyl, cyclooctyl, cyclononyl, cyclodecyl, cycloundecyl and cyclododecyl.

The benzothiazolyl radical is substituted in the 5 or 6 position with a nitro radical, the 6-nitro-benzothiazolyl moiety being preferred.

Illustrative examples of the new accelerators of this invention are 6-nitro-2-(methyldithio)benzothiazole,
6-nitro-2-(ethyldithio)-benzothiazole,
6-nitro-2-(propyldithio)benzothiazole,
6-nitro-2-(n-butyldithio)benzothiazole,
6-nitro-2-(isobutyldithio)benzothiazole,
6-nitro-2-(tert-butyldithio)benzothiazole,
6-nitro-2-(pentyldithio)-benzothiazole,
6-nitro-2-(isopentyldithio)benzothiazole,
6-nitro-2-(hexyldithio)benzothiazole,
6-nitro-2-(octyldithio)benzothiazole,
6-nitro-2-(decyldithio)benzothiazole,
6-nitro-2-(dodecyldithio)benzothiazole,
6-nitro-2-(cyclopentyldithio)benzothiazole,
6-nitro-2-(cyclohexyldithio)benzothiazole,
6-nitro-2-(2-methylcyclohexyldithio)benzothiazole,
6-nitro-2-(2,5-dimethylcyclohexyldithio)benzothiazole,
6-nitro-2-(cycloheptyldithio)benzothiazole,
6-nitro-2-(cyclooctyldithio)benzothiazole,
6-nitro-2-(cyclodecyldithio)benzothiazole,
6-nitro-2-(cyclododecyldithio)benzothiazole
and their 5-nitro counterparts.

The accelerators of this invention can be used in any sulfurvulcanizable diene rubber. Natural and synthetic rubbers and mixtures thereof are suitable. Synthetic rubbers include cis-4-polybutadiene, butyl rubber, ethylene-propylene terpolymers, polymers of 1,3-butadiene, polymers of isoprene, copolymers of 1,3-butadiene with other monomers, for example, styrene, acrylonitrile, isobutylene, and methylmethacrylate.

The accelerators are particularly applicable to rubber compositions containing sulfur-vulcanizing agents. Sulfur-vulcanizing agent means elemental sulfur or sulfur containing vulcanizing agent which at cure temperature or below releases sulfur in the form available to cross-link the rubber. Illustrative vulcanizing agents are amine disulfide and polymeric polysulfide, for example, alkyl phenol disulfides and dimorpholinodisulfide. Of course, the rubber compositions may contain the usual compounding ingredients, for example, reinforcing pigments such as carbon black or silica, metal oxide activators such as zinc oxide, organic activators such as diphenyl guanidine, stearic acid, antidegradants of the phenolic or amine type, for example, alkylene-bridged cresols, styrenated phenol, stearically-hindered hyroquinones, quinolines and N-alkyl-N'-phenyl-p-phenylene diamines. The rubber may also contain tackifiers and bonding agents such as the phenol-formaldehyde resins. Normally, because of the excellent processing safety of the stocks containing the accelerators of this invention, no prevulcanization inhibitor is needed, however, inhibitors may be used if required, for example, N-(cyclohexylthio)phthalimide.

The amount of accelerator used varies somewhat depending upon the other components in the vulcanizable composition and upon the properties desired of the vulcanizate. The optimum accelerator level is readily determined by those skilled in the art of rubber vulcanization. Usually, the amount is between 0.2–5 parts per 100 parts of elastomer but more commonly the amount is 0.5–2.0 parts.

DESCRIPTION OF THE PREFERRED EMBODIMENTS

The compounds of this invention may be prepared by reaction of the sodium salt of nitro-mercaptobenzothiazole with the appropriate sulfenyl chloride. The procedure shown in Ann. Chem. 45, 832 (1955); C. A. 50, 11967a is satisfactory. The procedure used herein comprises the reaction of nitro-mercaptobenzothiazole with an N-(thio)amide to give the desired disulfide. Further details of the reaction are taught in U.S. patent application Ser. No. 880,893, filed Nov. 28, 1969 now U.S. Pat. 3,705,923, issued Dec. 12, 1972. Satisfactory thioamide reactants are shown in U.S. Pat. 3,546,185 and a preferred subgroup of thioamide reactants are shown in U.S. Pat. 3,586,696. The reaction is illustrated by the equation:

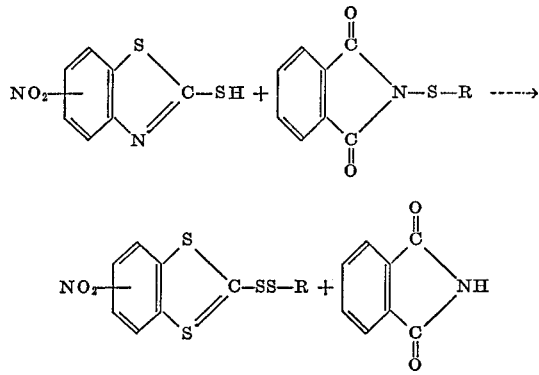

Example 1

A stirred mixture containing 52.3 g. (0.2 mole) of N-(cyclohexylthio)phthalimide and 42.5 g. (0.2 mole) of 6-nitro-2-mercaptobenzothiazole in 300 ml. of isopropanol is heated at reflux for 3 hours. The mixture is cooled and stirred at 25–30° C. for 24 hours. Sodium hydroxide 48 grams of 25% solution (0.3 mole) and 700 ml. of water are added and the mixture stirred for ½ hour. The product is recovered by filtration, washed with water and air dried at 25–30° C. 6-nitro - 2 - (cyclohexyldithio)benzothiazole is recovered, M.P. 106° C. recrystallized from alcohol. Analyses give 47.62% C, 4.31% H, 8.33% N, 10.01% O and 29.67% S compared to 47.83% C, 4.32% H, 5.58% N, 9.80% O and 29.47% S calculated for $C_{13}H_{14}N_2O_2S_3$.

Example 2

N-(tert-butylthio)phthalimide (23.5 g.; 0.1 mole) and 6-nitro-2-mercaptobenzothiazole (23.7 g.; 0.11 mole) in (3.5 g., 16.5 mmoles) in 40 ml. of methanol and 250 ml. of benzene at 58–60° C. The mixture is stirred for 1.5 hours at 58–60° C. and overnight at room temperature. The mixture is evaporated to dryness and the residue sluurried in warm benzene. By-product phthalimide is recovered by filtration. The filtrate is washed four times with 0.25 N sodium hydroxide and twice with water. Evaporation of the benzene gives 6-nitro-2 - (isopropyldithio) benzothiazole, M.P. 78–80° C. recrystallized from heptane. Analyses give 9.89% nitrogen and 33.44% sulfur compared to 9.79% nitrogen and 33.60% sulfur calculated for $C_{10}H_{10}N_2O_2S_3$. Identification is confirmed by nuclear magnetic resonance spectral analysis.

Example 3

N-(tert-butylthio)phthalimide (23.5 g.; 0.1 mole) and 6-nitro - 2 - mercaptobenzothiazole (23.7 g.; 0.11 mole) in 200 ml. of dimethylformamide are stirred at 80–90° C. for 24 hours. After cooling the mixture to room temperature, 32 grams of 25% NaOH (0.2 mole) and 700 ml. of water are added. The mixture is cooled to 0° C., stirred for one-half hour at 0–10° C., and the precipitate collected by filtration, washed with water until neutral and air dried at 25–30° C. 6-nitro-2-(tert-butyldithio)benzothiazole (27 g., 90% yield), M.P. 119–120° C. recrystallized from heptane, is recovered. Analysis gives 43.96% C, 4.17% H, 9.34% N, 10.41% O and 32.45% S compared to 43.98% C, 4.02% H, 9.33% N, 10.65% O, and 32.02% S calculated for $C_{11}H_{12}N_2O_2S_3$.

The following tables illustrate the invention in greater detail and the best mode for carrying it out, but are not to be construed as to narrow the scope of our invention. For all the rubber stocks tested and described, infra, as illustrative of the invention, Mooney scorch times at 121° C. are determined by means of a Mooney plastometer. The time in minutes ($t_5$) required for the Mooney plastometer reading to rise five points above the minimum viscosity is recorded. Longer times on the Mooney Scorch Test are desirable because this indicates greater processing safety. Cure ratings are calculated from the time required to cure the stocks at 144° C. Curing characteristics are determined by means of the Monsanto Oscillating Disk Rheometer described by Decker, Wise and Guerry in Rubber World, December 1962, page 68. From the rheometer data, R. M. T. is the maximum torque in rheometer units, $t_2$ is the time in minutes for a rise of two rheometer units above the minimum reading and $t_{90}$ is the time required to obtain a torque 90% of the maximum. The difference, $t_{90}-t_2$, is indicative of the cure rate. Vulcanizates are prepared by curing in a press for the optimum time as indicated by the rheometer data.

Table I illustrates the vulcanization of natural rubber stocks containing 6-nitro-2-(isopropyldithio)benzothiazole as accelerator. Stocks 1 and 2 contain 2-mercaptobenzothiazole and benzothiazolyl disulfide, respectively, as controls for purposes of comparison. The stocks are prepared from a masterbatch containing the following ingredients. All parts by weight.

| | Parts |
|---|---|
| Natural rubber | 100 |
| ISAF carbon black | 45 |
| Zinc oxide | 3 |
| Stearic acid | 2 |
| Processing oil | 5 |
| N-1,3-dimethylbutyl-N'-p-phenylenediamine | 2 |
| Total | 157 |

TABLE I

| Stock number | 1 | 2 | 3 |
|---|---|---|---|
| Masterbatch | 157 | 157 | 157 |
| Sulfur | 2.2 | 2.2 | 2.2 |
| 2-mercaptobenzothiazole | 0.75 | | |
| Benzothiazolyl disulfide | | 0.75 | |
| 6-nitro-2-(isopropyldithio)-benzothiazole | | | 0.75 |
| Mooney scorch at 121° C.: $t_5$, min | 12.9 | 18.6 | 28.6 |
| Rheometer at 144° C.: | | | |
| $t_2$, min | 5.0 | 6.0 | 9.5 |
| $t_{90}$, min | 22.5 | 23.0 | 24.5 |
| $t_{90}-t_2$ | 17.5 | 17.0 | 15.0 |
| R.M.T. | 47.0 | 47.5 | 52.0 |
| Stress-strain data at 144° C.: | | | |
| Cure time, min | 40 | 40 | 40 |
| 300% modulus, p.s.i | 1,130 | 1,060 | 1,240 |
| Ultimate tensile strength | 3,000 | 2,980 | 3,250 |
| Ultimate elongation, percent | 530 | 550 | 530 |

The data show that 6-nitro-2-(isopropyldithio)-benzothiazole is an accelerator which is as potent and as fast curing as the commercial accelerators but which possesses substantially greater processing safety.

Table II illustrate the vulcanization of stocks containing 6-nitro-2-(isopropyldithio)benzothiazole and 6-nitro-2-(cyclohexyldithio)benzothiazole as accelerators compared to 6-nitro-2-(phenyldithio)benzothiazole.

TABLE II

| Stock number | 1 | 2 | 3 |
|---|---|---|---|
| Masterbatch | 157 | 157 | 157 |
| Sulfur | 2.2 | 2.2 | 2.2 |
| 6-nitro-2-(phenyldithio)-benzothiazole | 0.6 | | |
| 6-nitro-2-(isopropyldithio)-benzothiazole | | 0.6 | |
| 6-nitro-2-(cyclohexyldithio)-benzothiazole | | | 0.6 |
| Mooney scorch at 121° C.: | | | |
| $t_5$, min | 14.0 | 21.5 | 24.5 |
| Percent increase in scorch delay | | 54 | 75 |

The data illustrate that from the standpoint of processing safety the cycloalkyl compounds are preferred and that both alkyl and cycloalkyl compounds have substantially greater processing safety than the 6-nitro-2-(phenyldithio)benzothiazole. The composition of Stock 3 containing 0.2 part diphenyl guandine gives a vulcanizate with physical properties comparable to a similar composition containing 0.6 part benzothiazolyl disulfide and 0.2 part diphenyl guanidine.

A rubber stock comprising 157 parts of masterbatch, 2.2 parts of sulfur and one part 6-nitro-2-(tert-butyldithio)benzothiazole has a Mooney Scorch $t_5$ value of 50 minutes.

The compounds of this invention are excellent accelerators for compositions wherein the presence of amines is undesirable. For instance, in articles reinforced with textile materials which are degraded by amines or in articles wherein the presence of amine has a deleterious effect on the bond between the rubber and the reinforcing member.

Although the invention has been illustrated by typical examples, it is not limited thereto. Changes and modifications of the examples of the invention herein chosen for purposes of disclosure can be made which do not constitute departure from the spirit and scope of the invention.

The embodiments of the invention in which an exclusive property or privilege is claimed are defined as follows:

1. A method of vulcanizing a sulfur-vulcanizable diene rubber which comprises:
   mixing the rubber with sulfur-vulcanizing agent and an accelerating amount within the range of 0.2-5 parts per 100 parts of rubber of an accelerator of the formula

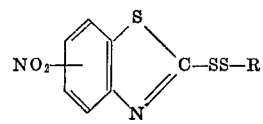

in which R is alkyl of 1–12 carbon atoms or cycloalkyl of 5–12 carbon atoms, and heating to effect vulcanization.

2. The method of claim 1 in which R is cycloalkyl of 5–8 carbon atoms and the nitro radical is attached in the six position.

3. The method of claim 2 in which R is cyclohexyl.

4. The method of claim 1 in which R is alkyl of 3–8 carbon atoms and the nitro radical is attached in the six position.

5. The method of claim 4 in which R is isopropyl.

6. The method of claim 4 in which R is tert-butyl.

References Cited

UNITED STATES PATENTS 2,026,863   1/1936   Bogemann _____ 260—306.5

JOSEPH L. SCHOFER, Primary Examiner

C. A. HENDERSON, Jr., Assistant Examiner

U.S. Cl. X.R.

260—306.5, 785